G. W. ROLLINS.
MACHINE FOR THREADING NUTS UPON BOLTS.
APPLICATION FILED JULY 28, 1919.
1,364,318.
Patented Jan. 4, 1921.
4 SHEETS—SHEET 4.
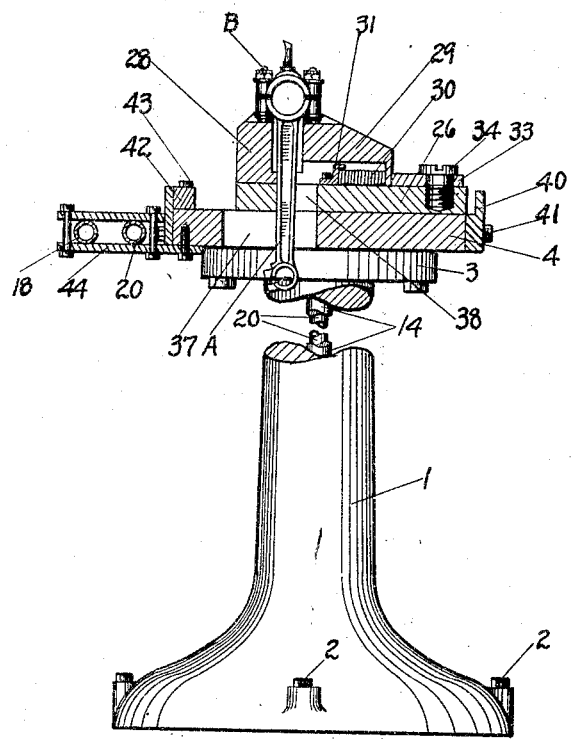
Fig. V.
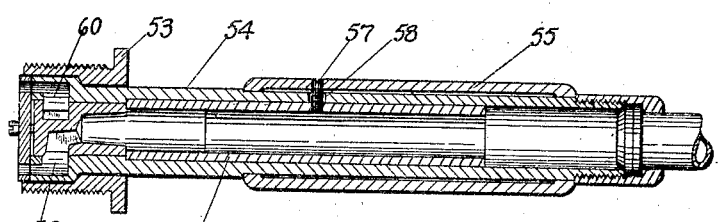
Fig. VI.
INVENTOR.
Grant W. Rollins
BY
Chester W. Braselton
ATTORNEY

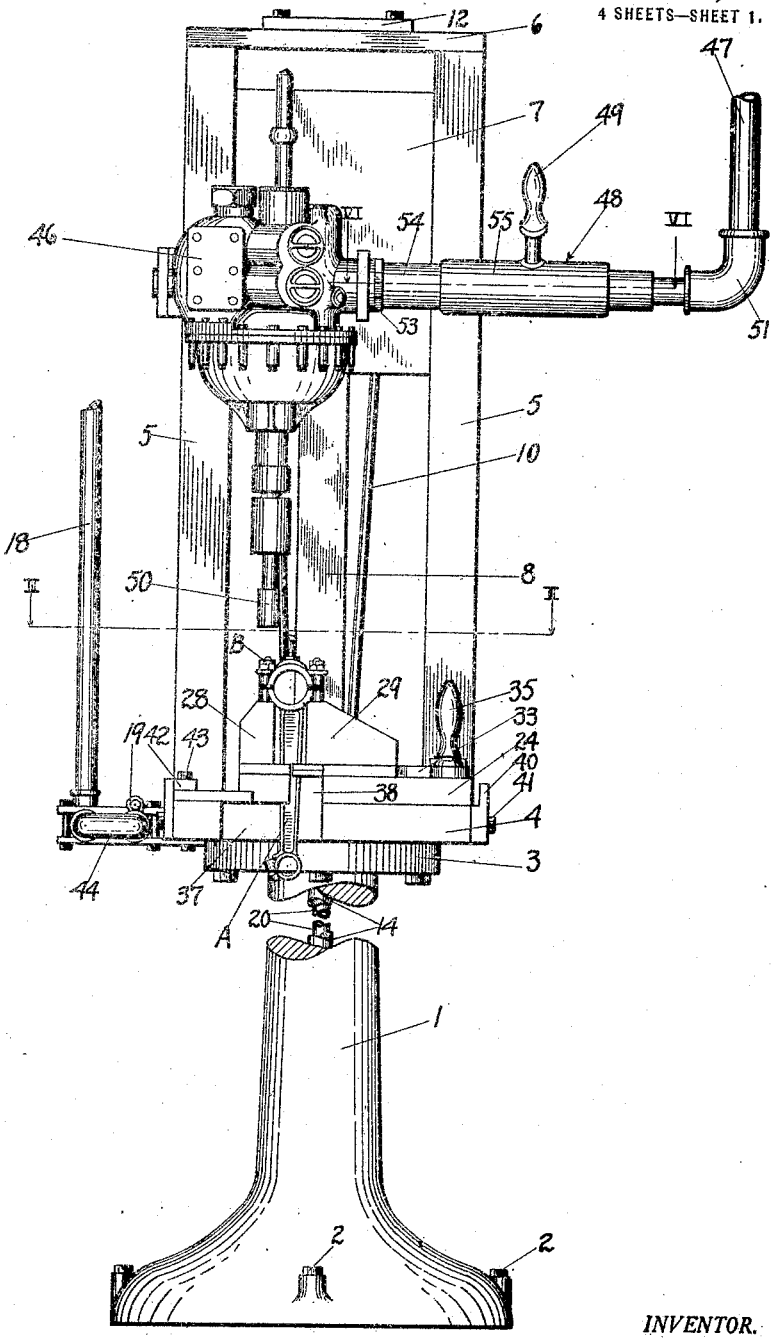

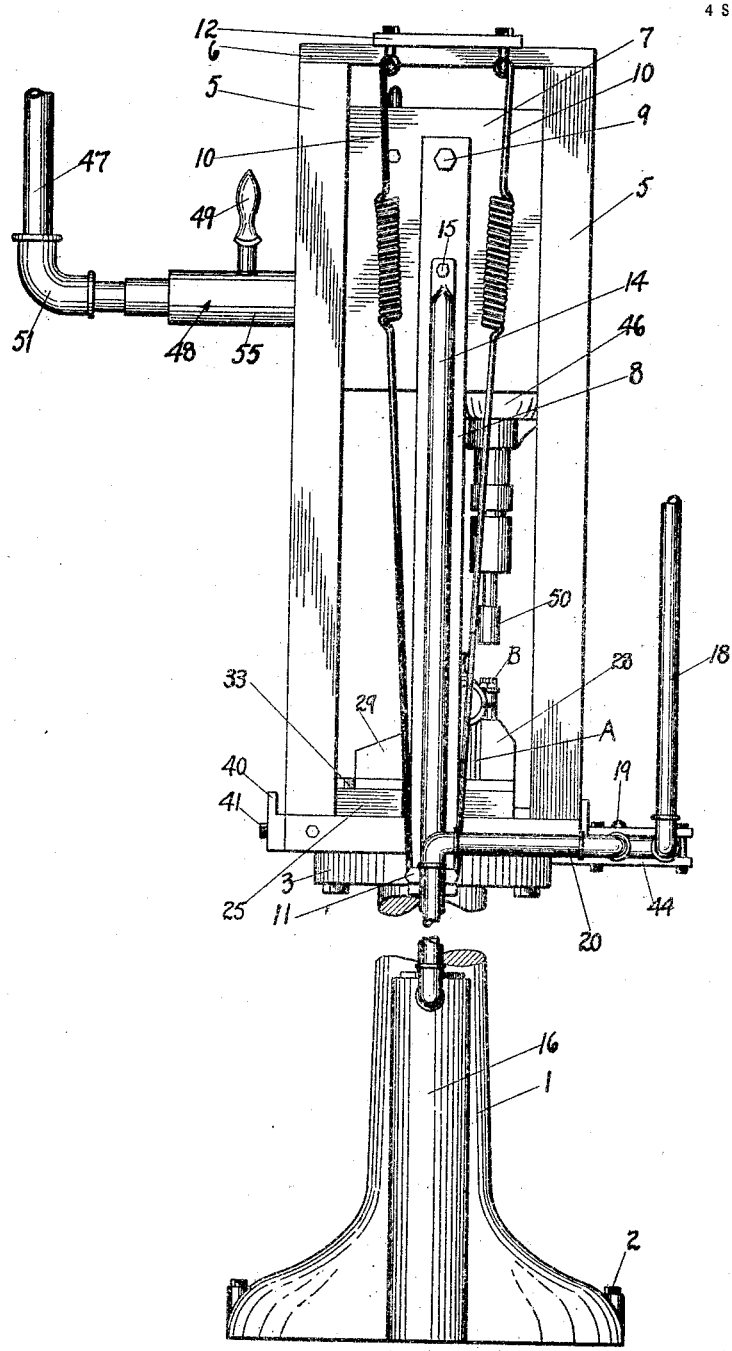

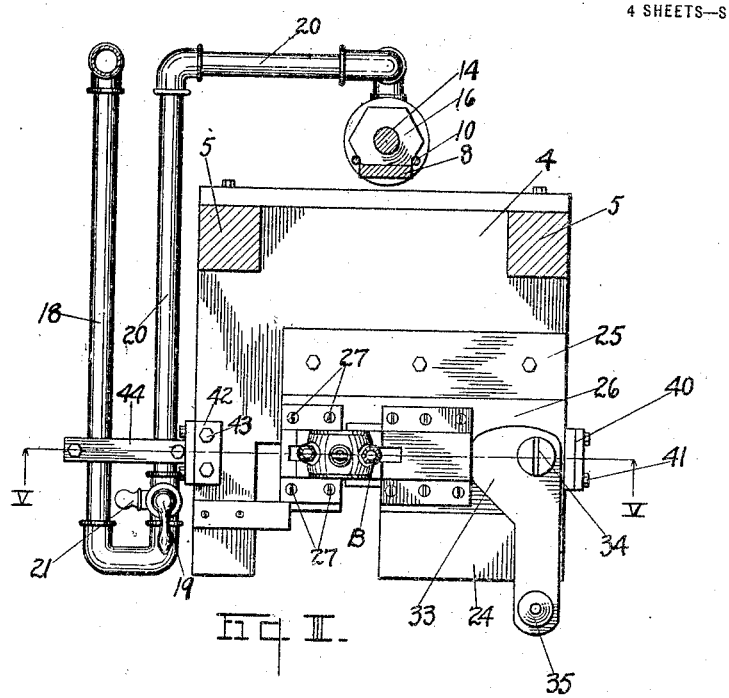
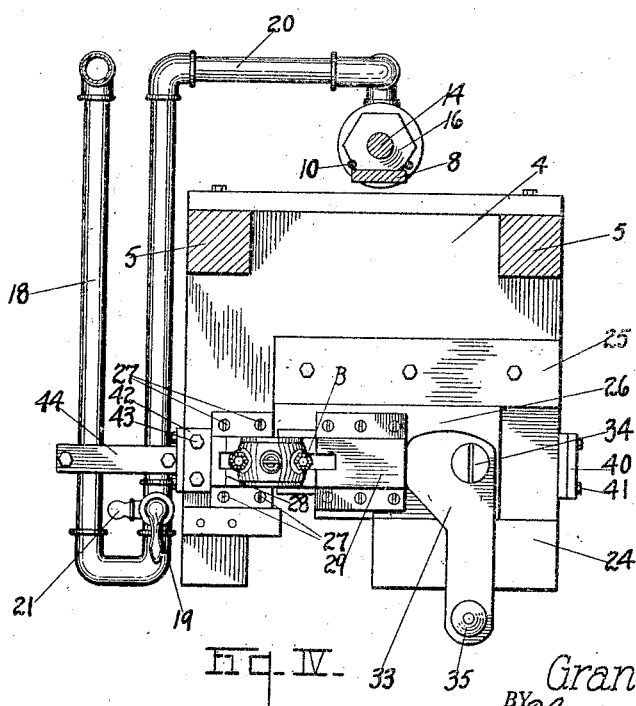

UNITED STATES PATENT OFFICE.

GRANT W. ROLLINS, OF TOLEDO, OHIO, ASSIGNOR TO THE WILLYS-OVERLAND COMPANY, OF TOLEDO, OHIO, A CORPORATION OF OHIO.

MACHINE FOR THREADING NUTS UPON BOLTS.

1,364,318.     Specification of Letters Patent.     Patented Jan. 4, 1921.

Application filed July 28, 1919. Serial No. 313,696.

*To all whom it may concern:*

Be it known that I, GRANT W. ROLLINS, residing at Toledo, in the county of Lucas, State of Ohio, have invented certain new and useful Improvements in Machines for Threading Nuts Upon Bolts, of which I declare the following to be a full, clear, and exact description.

This invention relates to machines for threading nuts upon bolts, and is particularly adapted to be employed in connection with nuts so positioned as not to be readily accessible by means of the usual type of wrench.

One object of the invention is to provide a device of this character which is of simple construction and efficient in operation.

A further object of the invention is to provide a device of this character wherein suitable means are provided for supporting the work which is to be operated upon whereby the same is retained in position relative to the automatically operating rotating member employed for screwing the nut upon the bolt.

A further object of the invention is to provide a device of this character wherein the member adapted to screw the nut upon the bolt is positioned for vertical movement whereby it may be readily brought into operative position relative to the nut, and wherein suitable means is provided for controlling the rotation of the operating member.

A further object of the invention is to provide improved means for suitably retaining the bolts and nuts which are to be operated upon in proper position relative to the operating member.

Further objects of the invention relate to economies of manufacture and details of construction as will hereinafter appear from the detailed description to follow.

The objects of the invention are accomplished in one instance by the devices and means described in the following specifications, but it is evident that the same may be varied widely without departing from the scope of the invention as pointed out in the appended claims.

A structure constituting one embodiment of the invention is illustrated in the accompanying drawings forming a part hereof in which:

Figure I is a front elevational view of the machine, showing the position of a connecting rod when operatively supported in position relative to the operating member.

Fig. II is a rear elevation of the machine.

Fig. III is a transverse sectional view taken along the line III—III of Fig. I, and showing the supporting table illustrating the position of the sliding member carried thereby when the same is in proper position for threading one of the nuts upon the connecting rod.

Fig. IV is a view similar to Fig. III, illustrating the position of the sliding member when the same is moved longitudinally of the table so as to bring the other nut carried by the connecting rod in a position to be operated upon by the rotating member.

Fig. V is a detail view partly in section, illustrating the relative position of the supporting table and sliding member when the parts are in position to operatively support a connecting rod.

Fig. VI is a longitudinal sectional view, taken along the line VI—VI of Fig. I and shows the operating mechanism of the air control valve.

Referring to the drawings, 1 designates the base for supporting the operating mechanism which may be secured to the flooring by means of suitable bolts 2 the support being provided with an enlarged head 3 to which a supporting table 4 is suitably secured. The supporting table 4 is provided near the rear edge thereof with a pair of upwardly extending standards 5 the upper end portions of which are connected by means of a cross beam 6. The upright standards 5 serve as guides for a block 7 which is mounted for vertical movement with respect to the upright standards and which supports a portion of the operating mechanism. The block 7 is provided with a downwardly extending plate 8 which is adapted to be secured to the block by suitable fastening devices as indicated at 9. A pair of tension members 10 are provided for retaining the block together with the mechanism carried thereby in raised position, each of these tension members being connected to the lower end portion of the plate 8 as at 11 and having the opposite ends thereof secured to a supporting plate 12 carried by the cross beam 6. It will be seen from an inspection of the drawings that the tension members 10 serve to normally retain the block 7 together with the operating mechanism carried thereby in raised position as shown in Figs. I and II of the drawings.

The upper end portion of a piston 14 is firmly secured to the block 7 by suitable fastening means 15, and the lower end portion of the piston is provided with a piston head (not shown) slidably mounted within the cylinder 16 and adapted to be drawn downwardly therein by means which will be hereinafter described for the purpose of lowering the block 7 together with the mechanism carried thereby. The movement of the piston head within the cylinder is, in the present instance, controlled by compressed air; the supply of compressed air to the cylinder passes through the supply pipe 18 and is controlled by means of the valve 19 which serves to place the pipe 18 in communication with the pipe 20 which connects the upper portion of the cylinder with the pipe 18 and thus draws the piston 14 downwardly through the air pressure admitted to the cylinder above the piston head (not shown). The valve 19 may be rotated to place the connecting pipe 20 in communication with an exhaust pipe 21 in order to permit the compressed air within the cylinder to pass therefrom and thus allow the block 7 to be raised to a normal position by means of the tension members 10.

Mounted upon the forward edge of the table 4 for slidable movement between a pair of spaced guides 24 and 25 is a member 26 to the upper surface of which is firmly secured in any suitable manner as by means of screws 27 a fixed jaw 28. A movable jaw 29 adapted to coöperate with the fixed jaw 28 is slidably positioned upon the upper surface of the member 26 and adapted to be forced outwardly away from the fixed jaw 28 by means of a compression spring 30 carried by the member 26 and engageable with a stop 31 and a portion of the movable jaw 29 to force the movable jaw away from the fixed jaw. A cam member 33 is pivotally mounted upon the upper surface of the member 26, being adapted to pivot about a screw 34 carried by the member 26 as a center. The cam member 33 is provided with a hand grip 35 for operating the same and when the cam member is rotated into the position illustrated in Figs. III and IV the movable jaw is engaged thereby and forced into engaging position with the fixed jaw 28.

The table 4 is provided with a recess 37 formed in the front edge thereof, and a similar recess 38 is formed in the slidable member 26 and positioned to correspond with the recess 37 formed in the edge of the table. These recesses serve to provide suitable openings whereby the connecting rod A may be positioned substantially vertically between the jaws 28 and 29 and clamped in position therebetween. The nuts B carried by the connecting rod are so positioned as to be accessible from above as shown in Figs. III and IV whereby the same may be threaded upon the bolts with which they engage by means of the operating mechanism. It will be seen upon reference to Fig. I of the drawings that when the slidable member 26 occupies the position shown in Figs. I, III and V one of the nuts B will be in substantial alinement with the operating mechanism whereby the same may be engaged and tightened upon rotation of the operating mechanism. A stop 40 is firmly secured to the side of the table by suitable fastening devices 41 whereby the movement of the slidable member is limited in this direction so that when the sliding member is in contact with the stop 40 one of the nuts B is properly positioned for engagement by the operating mechanism. In a similar manner a corresponding stop 42 is secured to the opposite side of the table by means of suitable fastening devices 43, and when the slidable member 26 is slid across the table into engagement with the stop 42 the other of the two bolts B is in proper position to be rotated by the operating mechanism. A supporting bracket 44 is carried by the edge of the table adjacent the stop 42 to provide a support for the compressed air pipes 18 and 20 previously described.

The operating mechanism for threading the nuts upon the bolts is supported by the block 7, and in the present instance comprises a compressed air motor 46 of the usual construction, the compressed air for the operation of which is supplied through a supply pipe 47 connected to the motor through a control valve mechanism 48 provided with a hand grip 49 for operating the same. Extending downwardly from the motor is a rotating head 50 which is capable of rotation in either direction depending upon the position of the valve 48 controlling the supply of compressed air to the motor. When the operating mechanism is depressed by compressed air being admitted to the upper end portion of the cylinder 16, the rotating head 50 is drawn into engagement with one of the nuts whereupon the handle 49 is rotated to admit compressed air to the motor and rotates the same in the proper direction for threading the nut on the bolt by means of the rotating head 50.

The construction of the valve for controlling the supply of compressed air to the motor will now be described. The valve comprises a connection 51 for connecting the same to the supply pipe 47, and a connection 53 between the valve and the motor. A casing member 54 extends between these connections and form the main body portion of the control valve. A sleeve 55 surrounds a portion of the member 54 and is rotatably positioned thereon. Rotatably mounted within the sleeve 54 is a valve control member 56 operatively secured to the rotatable sleeve 55 by means of a pin 57 which passes through a slot 58 formed in the sleeve 54. It will be understood that when the sleeve 55 is rotated the valve control member 56 positioned within the member 54 is rotated with the sleeve 55 and the supply of compressed air is admitted to the motor through either the passage 59 or 60 depending upon the degree of rotation of the sleeve 55. When the supply of compressed air is admitted to the passage 59 the compressed air motor is rotated in one direction, while when the supply of compressed air is admitted through the passage 60 rotative movement is given to the motor whereby the same is rotated in the opposite or reverse direction.

It will be understood from the foregoing description that the mechanism illustrated herewith is capable of being employed for the purpose of screwing nuts upon bolts carried by different elements or parts of machines, and that it is particularly applicable when from the form or shape of the elements the nuts are not readily accessible for operation by the original form of wrench. In the operation of this mechanism the work to be operated upon, which in the present instance is an automobile connecting rod, is positioned between the jaws of the slidable member whereupon the cam 33 is rotated to force those jaws into engagement with the member which is to be held in position and the sliding member is positioned at one side of the table bearing against one of the stops formed thereon so as to position one of the nuts in a proper manner for the same to be operated upon by the operating mechanism. The work thus being properly arranged in position, the valve 19 is operated to admit compressed air to the upper portion of the cylinder whereupon the block 7 is drawn downwardly until the head 50 is in engagement with the nut when the handle 49 is rotated in the proper direction for causing rotative movement of the head through the compressed air motor whereupon the nut is screwed up upon the connecting rod. When the nut has thus been properly seated in position the handle 49 is rotated to cut off a supply of compressed air to the motor, and the valve 19 is operated to cut off the supply of compressed air to the cylinder and also to place the cylinder supply pipe 20 in communication with the exhaust pipe 21 whereupon the compressed air in the cylinder is exhausted and the tension members 10 return the block 7 to its original position. The slidable member 26 is then moved to the opposite side of the supporting table and into engagement with the oppositely positioned stop thus placing the other nut carried by the connecting rod in proper position to be operated upon by the rotating head 50. The valve 19 is then again actuated to place the cylinder in communication with the compressed air supply pipe 18 whereupon the operating mechanism is drawn downwardly into such position that the rotating head engages with the other nut carried by the connecting rod, whereupon the handle 49 is actuated to admit compressed air to the motor for rotating the head to force the other nut into firm position. Both of the nuts carried by the connecting rod having been firmly screwed into position the connecting rod is removed from between the jaws and the operation may be repeated in the same manner. While the apparatus is particularly shown and described in connection with the screwing of nuts upon the head of a connecting rod it is to be understood that any other machine parts may be operated upon by this mechanism, it being only necessary to make suitable changes in the adjacent faces of the jaws whereby they are adapted to properly grip and hold in position the element which is to be operated upon.

While I have shown and described in considerable detail a specific embodiment of my invention, it is to be understood that this showing and description is illustrative only and for the purpose of rendering my invention more clear, and that I do not regard the invention as limited to the details of construction illustrated or described except in so far as I have included such limitations within the terms of the following claims, in which it is my intention to claim all novelty inherent in my invention broadly as well as specifically.

What I claim as new and desire to secure by Letters Patent is:

1. In a machine for threading nuts on bolts, a support, a table carried thereby, a work holding member carried by said table, means for securing said work holding member in a variety of adjusted positions upon the table, a vertically movable rotatable member adapted to engage nuts carried by the work which is to be operated upon in the different positions of said work holding member and thread them upon the bolts.

2. In a machine for threading nuts on bolts, a support, a table carried thereby, a slidable work holding device comprising a fixed and a movable jaw together with a cam member for holding said jaws in clamping engagement with the material to be operated upon, said device being adapted to be secured in a variety of adjusted positions upon the table, a vertically movable rotatable member adapted to engage nuts carried by the material to be operated upon in different adjusted positions of said work holding device and thread them upon the bolts.

3. In a metal working machine, a support, a table carried thereby, parallel standards carried by said support, a block slidably mounted upon said standards and supporting a rotatable head, means carried by the table for supporting work so as to position a nut carried by said work directly beneath the rotating head, means for automatically drawing the block downwardly to bring the head into engagement with the nut carried by the work, and means for rotating the head when in engagement with the nut.

4. In a machine for threading nuts on bolts, a support, a table carried thereby, a slidably mounted rotatable head carried by the support above the table, means carried by the table for holding work in a plurality of adjusted positions whereby nuts carried by said work may be positioned directly beneath the rotatable head, means for drawing said head into engagement with said nuts and means for rotating said head while the same is held in engagement with the nuts.

In testimony whereof, I affix my signature.

GRANT W. ROLLINS.